Jan. 19, 1932.   W. VAN RIJSWIJK   1,841,863
FLUID APPARATUS
Filed Jan. 6, 1927
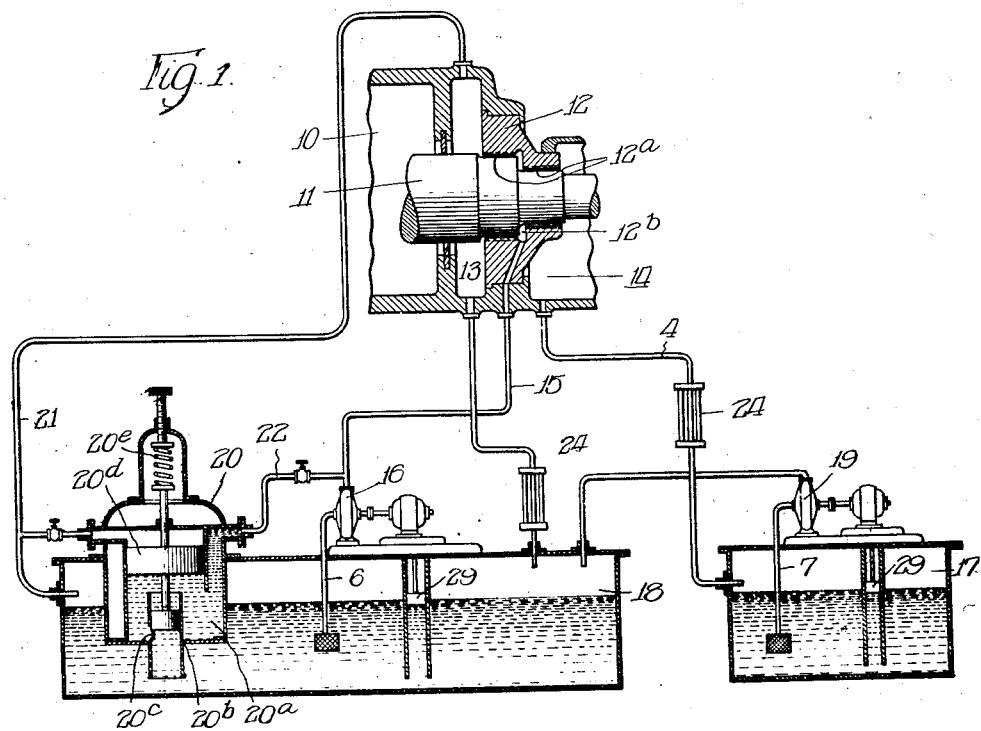
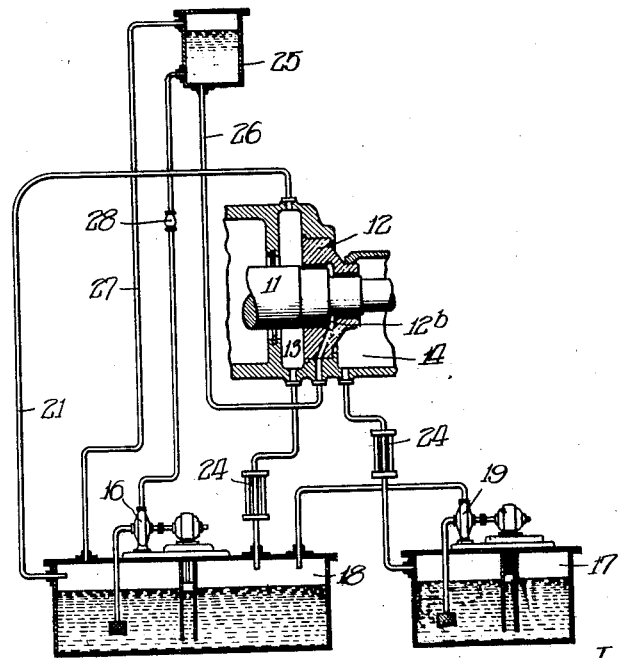

Patented Jan. 19, 1932

1,841,863

UNITED STATES PATENT OFFICE

WILLEM VAN RIJSWIJK, OF ENNETBADEN, SWITZERLAND, ASSIGNOR TO AKTIEN-GESELLSCHAFT BROWN BOVERI & CIE, OF BADEN, SWITZERLAND, A JOINT-STOCK COMPANY OF SWITZERLAND

FLUID APPARATUS

Application filed January 6, 1927, Serial No. 159,298, and in Germany January 18, 1926.

This invention relates to liquid sealed glands such, for example, as those wherein a sealing lubricant is employed to effect a seal between an operating shaft and the casing of a compressor or similar machine which is operated with considerable difference between internal and external pressures.

A general object of the invention is the provision of method and means whereby a liquid seal may be maintained between a gland and operating shaft or the like, with reliability, and without waste of power in the handling of the sealing liquid.

Another object is the simplification of mechanism employed for forming and maintaining such liquid seals.

A specific object is the provision of a method and apparatus whereby the seal may be maintained reliably without the necessity for throttling the pressure under which the sealing liquid is handled.

Another object is the provision of a mechanism and a method of operating same whereby the pressure at which the sealing liquid is handled may be varied automatically in accordance with variations in the pressure which the seal is intended to confine.

Other and further objects will be pointed out or indicated hereinafter or will appear to one skilled in the art upon an understanding of the invention or its employment in practice.

In the accompanying drawings forming a part of this specifiaction, I illustrate in diagrammatic fashion certain organizations of mechanism wherein the invention may be embodied or practiced, but it is to be understood that these are presented for purpose of illustration only, and that neither these, nor the examples explained by reference thereto, are to be construed in any fashion such as to limit the claims short of the true and most comprehensive scope of the invention in the art.

In said drawings,

Fig. 1 is a diagrammatic illustration of a gland and mechanism for handling the sealing liquid, the illustration being in the nature of a sectional elevation, but the various parts being of disproportionate sizes; and Fig. 2 is a similar diagrammatic illustration of another arrangement of apparatus of similar nature.

In apparatus heretofore generally employed for maintaining liquid seals in glands against gaseous pressures, it has been customary to supply the sealing liquid under pressure, which pressure is throttled down to a greater or lesser extent before the sealing liquid actually reaches the gland. Likewise, in the return flow of the sealing liquid from the gland, in order to maintain the proper back pressure in the seal against the pressure of the gas which it is intended to hold, it has been customary to pass the returning sealing liquid through another throttling device, before it is discharged to the reservoir or the handling pump. This throttling, in addition to requiring rather complicated controlling devices, which are likely sometimes to be unreliable, involves a loss of power which has to be immediately resupplied in order to feed the sealing liquid again to the gland. The present invention overcomes these disadvantages in an effective manner, as may be ascertained by reference to certain examples now to be described.

In the arrangement of apparatus illustrated in Fig. 1, let it be understood that the reference numeral 10 designates a casing portion of a machine, such as a compressor, within which a contained gas is raised to or maintained at a superatmospheric pressure, or a pressure in excess of that outside the casing 10. The reference numeral 11 designates a shaft which constitutes one of the working elements of the machine, said shaft passing through a gland 12 connected with the casing. This gland has sealing portions 12$^a$ formed for proper cooperation with the circumferential surface of the shaft to permit a sealing film of a suitable liquid to be maintained between them as an effective closure against the pressure of the gaseous medium in the casing 10. Between and in communication with the gland sealing surfaces 12$^a$, the gland affords a supply channel 12$^b$, while at the opposite ends of the gland, associated members are formed to provide catch chambers 14 and 13, the former being subject to the pressure existing outside the casing, and the latter being maintained under the pressure of the fluid contained in the casing 10. The sealing liquid is supplied to the supply channel 12$^b$ by way of a pipe 15 from a pump 16 at a pressure in excess of the pressure in the casing 10. From the supply channel 12$^b$, the sealing liquid flows along the gland surfaces 12$^a$ and the associated shaft surfaces, forming a seal between those portions. The sealing liquid traveling to the right from the channel 12$^b$ reaches the catch chamber 14 at atmospheric pressure, while that flowing to the left reaches catch chamber 13, where it is maintained under the same pressure as the fluid in casing 10. The sealing liquid from catch chamber 14 is conducted by a pipe 4 to a receptacle 17 where it is held at atmospheric pressure, while the sealing liquid from catch chamber 13 is conducted to a pressure reservoir 18, wherein it is maintained under the same pressure as that existing in the casing 10. The sealing liquid from receptacle 17 is pumped into the pressure reservoir 18 against the pressure therein by a transfer pump 19. Circulating pump 16 may be designed in such fashion so as to maintain a substantially uniform delivery pressure over a considerable range of delivery volume, or, where the operating conditions of the machine 10 are approximately uniform, the circulating pump 16 may be a constant speed pump, as of the centrifugal type. In instances where it may be desirable to provide for variation in the pressure of the sealing liquid as supplied to the gland, such control may be exercised automatically, in a predetermined relationship to the pressure in casing 10, by means of an automatic pressure regulator 20. This regulator has the outlet chamber 20$^a$, discharge from which is controlled by a valve 20$^b$, the position of which determines the effective area of a discharge port 20$^c$. Valve 20$^b$ is controlled in part by a piston 20$^d$ and in part by a spring 20$^e$, the space above the piston 20$^d$ being connected by a pipe 21 with the pressure of the casing 10. Discharge chamber 20$^a$ is connected by a pipe 22 with the discharge pipe 15 of the circulating pump, so that the pump pressure is rendered effective on piston 20$^d$ against the pressure of the fluid in casing 10 and against the pressure of the spring 20$^e$. Discharge from the chamber 20$^a$ through discharge port 20$^c$ is equalized with supply by way of pipe 22 when pressure in pipe 15, and hence the pressure at which the medium is supplied to the gland, is equal to the pressure in casing 10 plus the pressure of spring 20$^e$. Thus, by control of leakage discharge from line 15 through pipe 22, the pressure of supply to channel 12$^b$ is automatically controlled in a definite relationship to pressure in casing 10. To prevent the sealing liquid from becoming unduly heated, coolers 24 are inserted at convenient locations in the circulating system.

In the arrangement illustrated in Fig. 2, the installation is provided with a safety or reserve element which will prevent the gland's running dry in the event of the stopping of the circulating pump for a limited period. In this illustration, the parts corresponding to those shown in Fig. 1 are designated by like reference numerals. The pipe from the circulating pump 16, instead of leading directly to the channel 12$^b$, leads to a gravity head reservoir 25, from which a pipe 26 leads to the channel 12$^b$. In the head reservoir 25, the sealing liquid is maintained under the same pressure as that existing in casing 10 plus the head pressure resulting from the elevation of the tank. A safety pipe 27 may be arranged to connect the gravity head tank with the pressure reservoir 18, for return of sealing liquid. A non-return valve 28 is inserted in the line between the pump 16 and the head reservoir 25. Pumps 16 and 19 are regulated by suitable gauge devices 29 responsive to variations in the level of liquid in the receptacle 17 and pressure reservoir 18.

What I claim is:

1. The combination with a fluid handling device including a casing for receiving a fluid under pressure a shaft rotatable within said casing and extending therefrom, said casing being formed to provide a plurality of chambers about said shaft having different pressures prevailing therein, of a plurality of reservoirs for receiving and maintaining the sealing fluid under different pressures, means for supplying a sealing fluid to the one of said chambers at highest pressure from the reservoir at higher pressure, means for returning the fluid passing from the said chamber at highest pressure to the chamber of intermediate pressure to the reservoir at higher pressure, and means for returning the fluid passing from the highest pressure chamber to the chamber at lowest pressure to the reservoir at lower pressure.

2. The combination with a fluid handling device including a casing for receiving a fluid under pressure, a shaft rotatable within said casing and extending therefrom, said casing being formed to provide a plurality of chambers about said shaft having different pressures prevailing therein, of a plurality of reservoirs for receiving and maintaining a sealing fluid under different pressures, means for supplying the sealing fluid to the chamber at highest pressure from the reservoir at higher pressure, means for returning the fluid passing from the chamber at highest pressure to the chamber of intermediate pressure to the reservoir at higher pressure, means for returning the fluid passing from the highest pressure chamber to the chamber at lowest pressure to the reservoir at lower pressure, and means for returning the sealing fluid from the reservoir of lower pressure to the reservoir at higher pressure.

3. The combination with a fluid handling device including a casing for receiving a fluid at a pressure differing from atmospheric pressure, a shaft operable within said casing and extending therefrom, said casing forming three chambers about the outwardly extending end of said shaft, the chambers being at different pressures, of two reservoirs for receiving and maintaining a sealing fluid under different pressures, means for conveying sealing fluid from the lower pressure reservoir to the higher pressure reservoir, means for supplying sealing fluid from the reservoir of higher pressure to the chamber at highest pressure, and means for controlling the pressure in the chamber of highest pressure in dependence on the fluid pressure in said casing.

4. The combination with a fluid handling device including a casing for receiving a fluid at a pressure differing from atmospheric pressure, a shaft operable within said casing and extending therefrom, said casing forming three chambers about the outwardly extending end of said shaft, the chambers being at different pressures, of two reservoirs for receiving and maintaining a sealing fluid under different pressures, means for conveying said sealing fluid from the lower pressure reservoir to the higher pressure reservoir, means for supplying said sealing fluid from the reservoir of higher pressure to the chamber at highest pressure, and a valve within the higher pressure reservoir operable by the pressure in said casing and the pressure in the means for conveying the sealing fluid to the highest pressure chamber for controlling the pressure within the said reservoir of higher pressure.

5. The combination with a fluid handling device including a casing for receiving a fluid at a pressure differing from atmospheric pressure, a shaft operable within said casing and extending therefrom, said casing forming three chambers about the outwardly extending end of said shaft, the chambers being at different pressures, of two reservoirs for receiving and maintaining a sealing fluid under different pressures, means for conveying said sealing fluid from the lower pressure reservoir to the higher pressure reservoir, means for supplying said sealing fluid from the reservoir of higher pressure to the chamber at highest pressure, and a piston operated valve for controlling the pressure of sealing fluid in the chamber of highest pressure, one side of the piston being under pressure of the fluid in said casing and the other side thereof being under pressure of the sealing fluid in the highest pressure chamber, and a spring for augmenting the pressure on the side of the piston exposed to the pressure in said casing.

6. The combination with a casing arranged to receive a fluid of varying pressures, a shaft rotatable within the said casing and extending therefrom, the said casing being formed to provide a plurality of chambers about said shaft arranged to receive a sealing fluid at relatively different pressures, a plurality of reservoirs arranged for receiving and maintaining said sealing fluid under different pressures, means for delivering the said sealing fluid from the reservoir at higher pressure to one of said chambers at a pressure higher than the pressure of said reservoir of higher pressure, means for discharging a portion of the said sealing fluid from the last said chamber through another of said chambers to the said reservoir of higher pressure at a pressure substantially the same as the pressure of the fluid within the said casing, and means for discharging a portion of the said sealing fluid through another of said chambers to the said reservoir of lower pressure at a pressure lower than the pressure of the fluid within the said casing.

7. The combination with a casing arranged to receive a fluid of varying pressures, a shaft rotatable within the said casing and extending therefrom, the said casing being formed to provide a plurality of chambers about said shaft arranged to receive a sealing fluid at relatively different pressures, a plurality of reservoirs arranged for receiving and maintaining said sealing fluid under different pressures, means for delivering the said sealing fluid from the reservoir at higher pressure to one of said chambers at a pressure higher than the pressure of said reservoir of higher pressure, means for discharging a portion of the said sealing fluid from the last said chamber through another of said chambers to the said reservoir of higher pressure at a pressure substantially the same as the pressure of the fluid within the said casing, means for discharging a portion of the said sealing fluid through another of said chambers to the said reservoir of lower pressure at a pressure lower than the pressure of the fluid within the said casing, and means for delivering the said sealing fluid from the reservoir of lower pressure to the reservoir of higher pressure.

8. The combination with a casing arranged to receive a fluid of varying pressures, a shaft rotatable within the said casing and extending therefrom, the said casing arranged to form a first chamber, a second chamber and a third chamber about the said shaft, a plurality of reservoirs arranged for receiving and maintaining a sealing fluid under different pressures, means for maintaining the sealing fluid in one of the said reservoirs at pressures substantially the same as the pressures of the fluid within the said casing, means for delivering the said sealing fluid into the said first chamber at pressures higher than the pressures of the sealing fluid within the reservoir of higher pressures, means for discharging a portion of the said sealing fluid from the said first chamber through said second chamber into the said reservoir of higher pressure at pressure substantially equal to the pressure of the said fluid in the said casing, and means for discharging a portion of the said sealing fluid from the said first chamber through the said third chamber into the said reservoir of lower pressure at pressures lower than the pressures of the said casing.

In testimony whereof I have hereunto subscribed my name this 13th day of December, A. D. 1926, at Zurich, Switzerland.

WILLEM van RIJSWIJK.